United States Patent Office 3,210,827
Patented Oct. 12, 1965

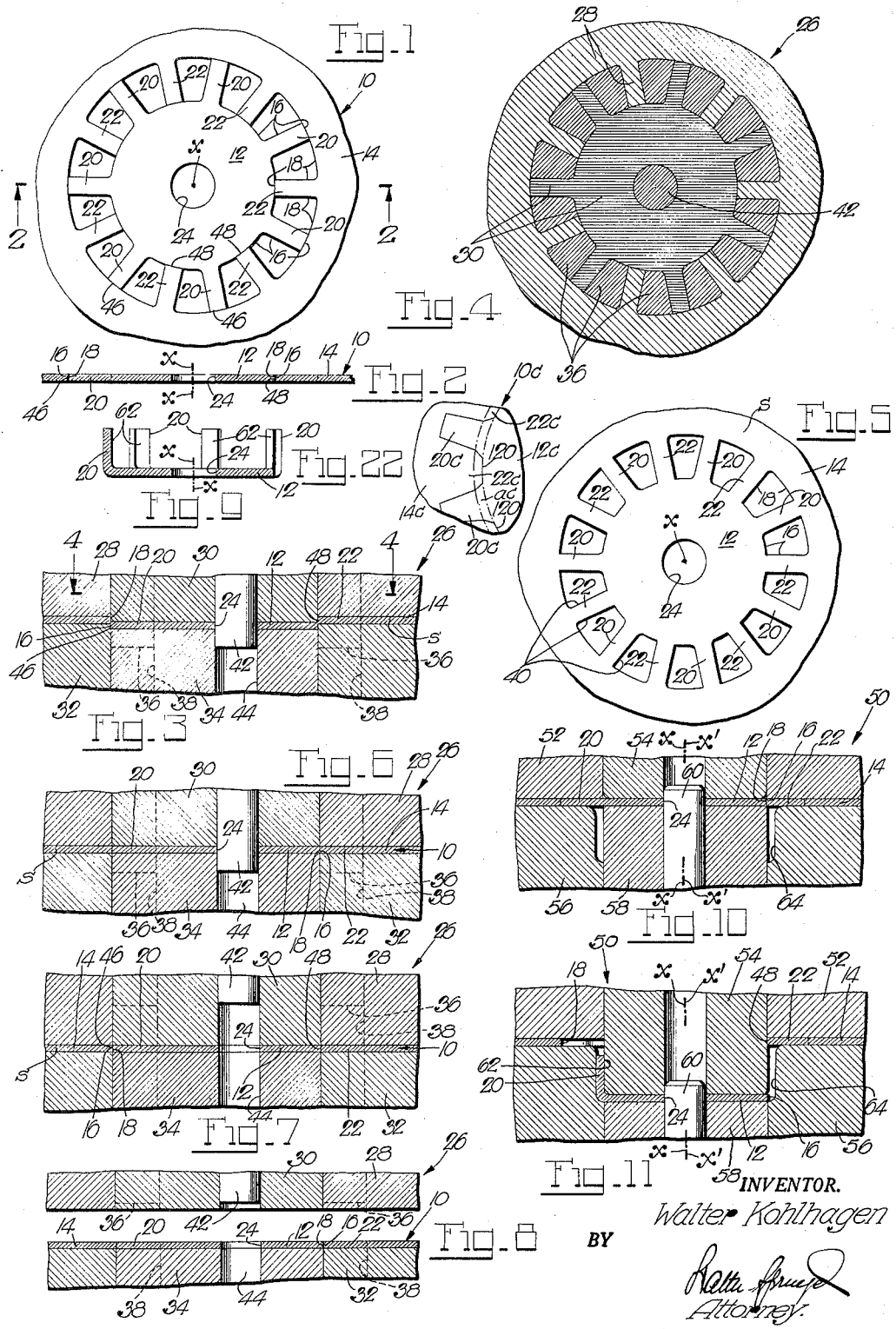

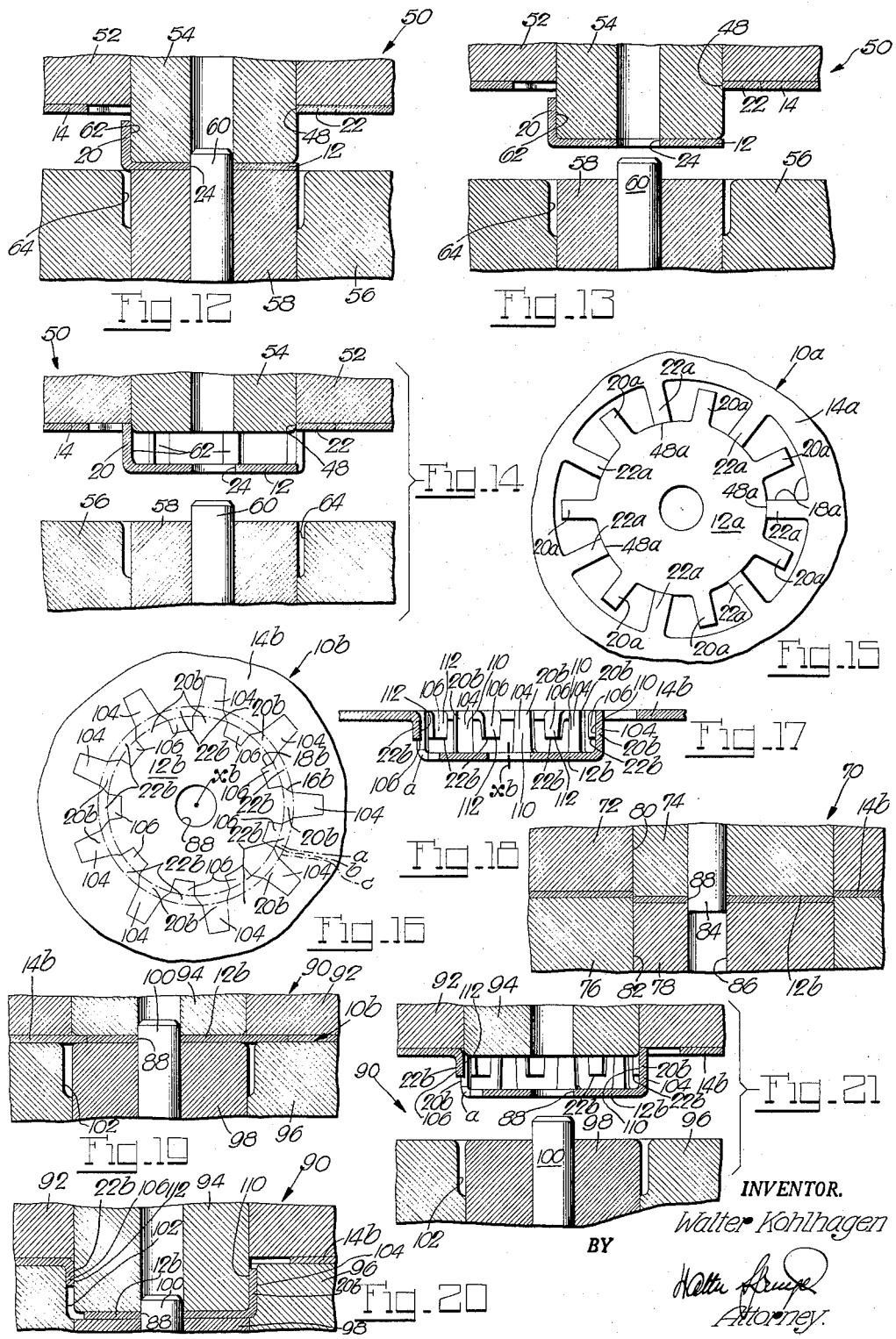

3,210,827
METHOD OF MAKING FIELD PLATES FOR SYNCHRONOUS MOTORS
Walter Kohlhagen, 818 Oakley Ave., Elgin, Ill.
Filed Aug. 23, 1961, Ser. No. 133,425
8 Claims. (Cl. 29—155.5)

This invention relates to reaction-type synchronous motors in general, and to field structures of motors of this type in particular.

Motors of this type have a permanent-magnet rotor, and a field structure with poles disposed circularly about the rotary axis and arranged in two sets of which successive poles of one set alternate with successive poles of the other set, and the poles of both sets are, during energization of an associated flux-inducing field coil, of opposite polarities at any instant, with their polarities changing in phase with the alternating current supplied to the coil to compel the rotor to step in synchronism with the alternation of the current.

The field poles of both sets are commonly provided by outer and inner pole formations on inner and surrounding outer field plates, respectively, which are customarily blanked from supply stock and formed in separate dies for their efficient and low-cost mass production. However, while the mass production of field plates in this fashion is efficient, its cost is only relatively low for it entails much waste of plate stock in the form of slugs which are blanked from the outer field plates for the formation of the inner poles thereon and, hence, are useless for any purpose other than scrap metal. Also, the production of inner and outer field plates in this fashion leaves them in their dimensions, shape and pole coordination with the corresponding tolerances of the respective dies in which they were produced. Accordingly, the individual field plates will, on the assembly of paired inner and outer field plates with the remaining field structure, largely contribute to the inevitable tolerances in the coordination of the paired pole sets which so impair the performance of motors of this type primarily in the matter of torque output and smooth running and frequently also self-starting.

It is an object of the present invention to provide for motors of this type inner and outer field plates such that in their formation the aforementioned waste of plate stock will be substantially eliminated, and the tolerances in the coordination of the pole sets of paired inner and outer field plates will, on their assembly with the remaining field structure, be at least greatly reduced from those heretofore for optimum performance of the motors, yet the cost of efficient mass production and assembly of these field plates is to be even less than that of previous field plates. To this end, an inner plate with its outer poles is in a die blanked from the outer plate and the blank-conforming aperture in the outer plate is in the same die trimmed to shape the inner poles of the outer plate, whereupon the plates are finish-formed for coordination of their poles in the relation which they will ultimately assume on assembly in a motor.

It is another object of the present invention to provide for motors of this type, inner and outer field plates which at an intermediate stage of their formation have their inner blanks pressfitted in their outer blanks as intermediate plate units for their joint finish-formation in a final die in which their pole sets will be coordinated with each other and with a reference rotor axis in the die with that optimum accuracy which is afforded by their common hold in the die. In thus finish-forming the plates of each intermediate unit and, in consequence, also separating them, they will on their subsequent assembly with the remaining field structure be with their pole sets coordinated with each other and with the rotor axis proper as accurately as in their final forming die as long as they are assembled in ready fashion with consecutive poles uniformly spaced from each other and both pole sets held in concentric disposition with respect to the rotor axis.

It is a further object of the present invention to devise a method of forming the aforementioned intermediate plate units, according to which an inner plate and the inner poles of an outer plate are shaped in a die on closing the same, by blanking the inner plate from the outer plate and, by punching waste material from the outer plate, trimming the blank-conforming aperture therein, with the blank dimensioned for pressfit in the trimmed plate aperture, while still in the closed die reentering the blank in the trimmed plate aperture, and opening the die for removal therefrom of the outer plate and pressed-in blank. In pursuing this method, the inner and outer plates will in their individual and coordinated dimensions and shapes be accurate within the closely held tolerances of the die and their accuracy in these respects will, by virtue of the reentry of the inner plate in the outer plate, be kept for their finish-formation in the aforementioned final die as much so as though they were both, blanked and finish-formed in the final die in a single operation. In particular, any tolerances in the poles of the blanks of the intermediate plate units will in no wise affect their formation in the final die accurately concentric with the reference rotor axis thereof, especially where the active poles of both plates are formed to extend parallel to this reference axis. Moreover, the inner field plates are formed from plate stock which heretofore was scrapped, thus achieving a very considerable savings in material and a corresponding reduction in cost of the field plates.

Another object of the present invention is to provide the aforementioned intermediate plate units the blanks of which are designed so that the inner plate blanks form-fit the respective outer plate blanks throughout, with the poles of the finished plates being on their assembly in motors nevertheless spaced from each other by the usual gaps, thereby not only permitting the use of a blanking die of simple and rugged construction and long useful life the tolerances of which may easily be held, and will for a long time hold, very closely, but also carrying to the ultimate scrapless formation of the inner plates from the outer plates.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary plan view of an intermediate field plate unit embodying the present invention;

FIG. 2 is a fragmentary section through the plate unit as taken on the line 2—2 of FIG. 1;

FIG. 3 is a fragmentary section through a die in which the plate unit is produced in accordance with a featured method which also embodies the present invention;

FIG. 4 is a section taken on the line 4—4 of FIG. 3;

FIG. 5 is a fragmentary plan view of the plate unit at an early stage of its formation in the die of FIG. 3;

FIGS. 6 to 8 show progressive steps in the operation of the die for the finish-formation of the plate unit and its removal from the die;

FIG. 9 is a section through one part of the plate unit after its finish-formation;

FIGS. 10 to 14 are fragmentary sections through another die in progressive stages of its operation for finish-forming a plate unit and for removal of the finish-formed parts thereof from the die;

FIG. 15 is a fragmentary plan view of an intermediate field plate unit embodying the invention in a modified manner;

FIG. 16 is a fragmentary plan view of an intermediate field plate unit embodying the invention in another modified manner;

FIG. 17 is a fragmentary section through both parts of the plate unit of FIG. 16 after their finish-formation;

FIG. 18 is a fragmentary section through a die in which the modified plate unit of FIG. 16 is formed;

FIGS. 19 to 21 are fragmentary sections through another die in which the modified plate unit of FIG. 16 is finish-formed into the separate parts of FIG. 17; and FIG. 22 is a fragmentary plan view of an intermediate field plate unit embodying the invention in a further modified manner.

Referring to the drawings, and more particularly to FIG. 1 thereof, the reference numeral 10 designates a plate unit which forms an intermediate product in the manufacture of conventional paired inner and surrounding outer field plates with sets of outer and inner field poles which in reaction-type synchronous motors cooperate with the premanent-magnet rotors thereof for stepping them in synchronism with the alternation of an applied current. The inner and outer plates 12 and 14 of the intermediate unit 10 are in their blank stage, with the inner plate blank 12 being pressfitted in the outer plate blank 14. The inner and outer blanks 12 and 14 have outer and inner peripheries 16 and 18 which are shaped to define outer and inner poles 20 and 22, respectively, with the usual gaps between them. The inner blank 12 is, in the present instance, pressfitted in the outer blank 14 by tight engagement of the inner poles 22 of the latter with the outer periphery 16 of the inner blank 12 intermediate the outer poles 20 thereof. In the present instance also, the inner blank 12 is further pressfitted in the outer blank 14 by tight engagement of the outer poles 20 of the inner blank with the inner periphery 18 of the outer blank intermediate the inner poles 22 thereof. The poles of each set 20 and 22 are, as usual, equi-angularly spaced from each other, and they are arranged circularly about, and extend radially of, a central reference rotor axis $x$ of the inner blank 12 which is preferably also provided with a round hole 24 centered on the axis $x$.

The plate blanks 12, 14 are thus combined into the intermediate plate unit 10 for their finish-formation with certain important advantages that will be explained more fully hereinafter. An important feature of the plate unit 10 is the formation of the inner part 12 thereof by blanking the same in its entirety from the outer part 14, thus forming the inner blank from plate stock which hitherto was blanked from outer field plates and scrapped. In keeping with this feature, the plate unit 10 is formed by a featured method of the present invention, according to which the inner plate and the poles of the outer plate are shaped by blanking the inner plate from the outer plate and trimming the blank-conforming aperture in the outer plate, respectively, with the blank dimensioned for press-fit in the trimmed plate aperture, and pressing the blank into the trimmed plate aperture. The plate unit 10 is thus formed preferably and advantageously in a die, with the inner plate being blanked from the outer plate on closing the die and the blank being pressed into the trimmed plate aperture while still in the closed die (FIGS. 3 and 6 to 8). Thus, flat magnetic plate stock $s$ may be placed into an open die 26 between upper and lower die members 28, 30 and 32, 34 of which the upper members may close on the stock resting on the lower members. Punches 36 in the upper die members 28 and 30 (FIGS. 3 and 4) may then be driven through the clamped supply stock $s$ and into mating die apertures 38 in the lower die members 32, 34 to form in the stock the apertures 40 (FIG. 5). A center punch 42 in the upper die member 30 may at the same time be driven through the stock $s$ and into a mating aperture 44 in the lower die member 34 to form in the stock the hole 24. Next, the upper and lower companion die members 30, 34 may be forced downwardly relative to the other die members 28, 32 (FIG. 3) to conclude the blanking of the inner plate 12 from the stock $s$ (FIG. 1). Thus, FIG. 3 shows the die members 30 and 34 in an advanced stage of their descent, and they will continue to descend until the inner plate 12 is completely blanked from the stock. At the same time, additional die members (not shown) may cooperate to blank the outer plate 14 from the supply stock. The die members 30 and 34 with the inner blank 12 therebetween may then be returned to the position shown in FIG. 6 for reentry of this blank 12 into the outer blank 14, whereupon the punches 36 and 42 may be retracted (FIG. 7) and the die subsequently opened by retraction of the upper die members 28, 30 (FIG. 8) for removal of the plate unit 10.

In thus forming the plate unit 10 in the die 26, the inner plate 12 and the poles or pole projections 22 of the outer plate 14 are actually shaped according to the aforementioned featured method, although the blanking of the inner plate from the outer plate is in the present instance preferably and advantageously performed in two successive steps. Thus, the punches 36, in forming the initial apertures 40 in the stock $s$ (FIG. 5), not only blank the inner plate 12 from the stock of the outer plate 14 except for the continuity at this stage of the outer and inner pole formations or projections 20 and 22 with the respective outer and inner plates, but they also simultaneously trim as much of the inner-blank conforming aperture in the outer plate as is required for shaping the inner poles on the outer plate. The subsequent complete severance of the inner blank from the outer plate at the outer ends 46 of the outer poles 20 and at the inner ends 48 of the inner poles 22 (FIGS. 1 and 3) merely concludes the blanking from the outer plate of the inner plate and dimensions the latter for reentry into the aperture in the outer plate.

The inner and outer blanks 12 and 14 of the intermediate plate unit 10 are next finish-formed, in accordance with a further step in the aforementioned method, by final coordination of the complementary poles of both blanks with each other and with the reference rotor axis $x$ of the inner blank 12. This involves, in the present instance, arrangement of the outer poles 20 of the inner blank 12 in parallelism with the reference axis $x$ thereof (FIG. 9), as well as their disposition accurately concentric with the active inner ends or faces 48 of the poles 22 of the outer plate 14 about the axis $x$ (FIG. 11). To this end, the plate unit 10 is placed in a forming die 50 (FIGS. 10 to 14) having upper and lower die members 52, 54 and 56, 58 of which the upper die members may close on the plate unit on the lower die members (FIG. 10). The plate unit 10 is with its center hole 24 preferably received on a locating pin 60 in the lower die member 58 for accurate orientation of its reference rotor axis $x$ with the die axis $x'$, i. e., in coincidence therewith. The companion die members 54 and 58 (FIGS. 10 and 11) are of the exact diameter of the active faces 48 and 62 of the poles of the finish-formed outer and inner plates 14 and 12, respectively, and the lower die member 56 has an annular recess 64 into which to draw the outer poles 20 of the inner blank 12 into parallelism with the coincident axes $x$ and $x'$. Thus, on locating the intermediate plate unit 10 on the pin 60 in the open die 50 and closing the latter (FIG. 10), the companion die members 54, 58 will be lowered relative to the other die members 52, 56 (FIG. 11) for bending the outer poles 20 of the inner blank 12 into the die recess 64 with their active pole faces 62 in accurate form and size fit with the upper die member 54 with which the active faces 48 of the inner poles 22 and the outer blank 14 are also in accurate form and size fit. The lower die member 58 and upper die members 52 and 54 may then be raised in unison to the position shown in FIG. 12 for removal of the finished inner plate 12 from the die recess 64, whereupon the upper die members 52, 54 may continue their ascent to the topmost position of the die member 52 (FIG. 13), with the other die member 54 continuing its ascent relative to the die member 52 beyond the position shown in FIG. 14 for stripping the finished and separated inner and outer plates 12 and 14 from the die member 54 for their subsequent removal from the die and future assembly in a motor.

The formation of the intermediate plate unit 10 and the subsequent finish-formation of their inner and outer plates 12 and 14 according to the described method secures a number of important advantages. To begin with, and as already mentioned, blanking the inner plate from the outer plate results in a large savings of plate stock with ensuing low cost of the field plates. In forming the intermediate plate unit 10 according to the described method in the significant respects of shaping the inner plate and the poles of the outer plate by blanking the inner plate from the outer plate and trimming the blank-conforming aperture in the outer plate, respectively, in a single die in which the blank is also dimensioned for pressfit in the trimmed plate aperture, and in the same die reentering the blank in the trimmed plate aperture, the poles of both blanks are in their dimensions and angular spacing from each other, as well as in their circular arrangement about the reference rotor axis $x$ of the inner blank, accurate within the closely held tolerances of the die, and they are held at the same accuracy in the plate unit. It is this accurate coordination of the poles with each oher and with the reference rotor axis in the intermediate plate unit 10 which makes for advantageous finish-formation of the inner and outer plates in a single final forming die for the desired end result of obtaining exceedingly accurate final coordination of all poles with each other and with the reference rotor axis $x$ of the finish-formed inner plate. Thus, on transferring the plate unit 10 to the forming die 50 with its center hole 24 oriented on the die pin 60 (FIG. 10), the inner poles 22 of the outer blank 14 and the outer poles 20 of the inner blank 12 are centered on the die axis $x'$ as accurately as though they were shaped in the forming die. Accordingly, with the periphery of the upper die member 54 being concentric with respect to the axis $x'$ of the forming die 50 within the closely held tolerances of the same, the active faces 48 of the poles 22 of the outer plate 14 will, on the descent of the die members 54 and 58 (FIG. 11), accurately fit the periphery of the die member 54 and thus be held to the annulus of the active faces 62 of the poles 20 of the inner plate 12 with the utmost accuracy, owing to the fact that the periphery of this die member 54 forms and sizes the active pole faces 62. In fact, on dimensioning the die member 54 diameterwise so as to have a slightly tight fit with the active pole faces 48 of the outer plate 14, these pole faces 48 will even be sized by the die member 54 the same as the active pole faces 62 of the inner plate 12. Moreover, the forming die 50 will thus coordinate the active pole faces 48 and 62 of the outer and inner plates 14 and 12 with the utmost accuracy despite tolerances in the circular disposition of the poles about the reference rotor axis of the intermediate plate unit 10. Thus, while the inner and outer plates 12 and 14 are on their finish-formation separated and must be assembled with a motor as separate parts, they may in their assembly be held with the utmost accuracy in their most important coordination, i. e., with all of their active pole faces extending in the same circle about the rotor axis proper, on temporarily locating them with their active pole faces on a reference arbor which they fit equally accurately and which may readily be accurately centered on the rotor axis proper. The active pole faces of the separate inner and outer plates may in their assembly be thus held coordinated in this all-important respect as much so as if these plates had never been separated. For finishing the accurate assembly of the separate field plates in a motor, it is merely necessary to hold their poles equally spaced from each other, and this is readily achieved.

While in the described formation of the inner and outer plates 12 and 14 the outer plate 14 is blanked from the supply stock in the blanking and trimming die 26, it is also fully within the purview of the present invention to blank the outer plate from the supply stock in the final forming die 50. In that case, the supply stock with the shaped inner poles 22 and the reentered inner blank 12 with the outer poles 20 may be intermittently fed from the initial die 26 directly to the final die 50 for blanking the outer plate from the stock and finish-forming the inner and outer plates in this final die. Also, while in the described formation of the inner and outer plates 12 and 14 the center hole 24 is punched in the inner blank advantageously in the initial die 26 not only for the customary center mount of the finish-formed inner field plate on a center core of the field structure of a synchronous motor, but also for accurate location of the plate unit 10 in the final die 50 on the pin 60 thereof, the formation in the initial die of the center hole in the intermediate plate unit may be dispensed with and the plate unit otherwise properly located in the final die, as by its shaped poles, for example. The center hole in the inner plate may then be formed in the final die, or may even be formed on assembly of the plates in a motor.

FIG. 15 shows a modified intermediate plate unit 10a in which the outer poles 20a of the inner blank 12a are spaced from the inner periphery 18a of the outer blank 14a and the reentered inner blank is firmly held between the ends 48a of the inner poles 22a of the outer blank. The intermediate plate unit 10a may be formed in a die which may be modified from the die 26 of FIG. 3 in self-evident manner, while the blanks 12a and 14a of this unit may be finish-formed in a die exactly like the forming die 50 of FIG. 10. With all dimensions other than the lengths of the poles being equal, the finish-formed inner plate 12a will be identical with the finished plate 12 of FIG. 9, except that the poles of plate 12a are shorter than those of plate 12. The modified intermediate plate unit 10a also points at an alternative plate unit in which the inner poles of the outer blank are spaced from the outer periphery of the inner blank and the reentered inner blank is firmly held with the ends of of its outer poles in the inner periphery of the outer blank. In that case, the poles of the inner blank are in a suitable forming die bent with only part of their lengths into parallelism with the reference rotor axis so as to be circularly disposed about this axis in coextension with the active ends of the inner poles of the outer blank, as will be readily understood. Also, while the intermediate plate unit 10 or 10a is adapted for the finish-formation of the blanks thereof involving bending of the poles of the inner blank only into parallelism with the reference rotor axis, it is quite obvious that the blanks of a similar plate unit may be finish-formed by bending the poles of both blanks at least in part into parallelism with the reference rotor axis.

While the described intermediate plate unit 10 (FIG. 1) is adapted for finish-formation of its plates so that only the poles of the inner plate need b bent into parallelism with the reference rotor axis for their final coordination with the poles of the outer plate, FIG. 16 shows a modified intermediate plate unit 10b which is adapted for finish-formation of its inner and outer blanks 12b and 14b so that the poles of both plates must, for their final coordination, be bent into parallelism with the reference rotor axis $xb$. Additionally, the outer and reentered inner blanks 14b and 12b of the plate unit 10b have identical inner and outer peripheries 18b and 16b, so that in their formation in accordance with the described method the ultimate in scrapless blanking of the inner plate from the outer plate is achieved. The reentered inner blank 12b is thus throughout form-fitted in the outer blank 14b, with the poles of either blank fully occupying the gaps between the poles of the other blank.

The plate unit 10b may be formed from flat plate stock in a die 70 (FIG. 18) having upper and lower die members 72, 74 and 76, 78 of which the upper die members may close on the stock on the lower die members. The companion die members 74, 78 have the outline of the outer periphery 16b of the inner blank 12b and fit in apertures 80 and 82 in the other die members 72 and 76 which have the outline of the inner periphery 18b of the outer blank 14b. On placing the stock in the open die and closing the same, a punch 84 in the upper die member 74 may first be driven through the stock and into a mating aperture 86 in the lower die member 78 for forming in the plate unit to-be-formed the center hole 88 about the reference rotor axis $xb$ (FIG. 16). The companion die members 74, 78 may thereupon be depressed beyond the position shown in FIG. 18 for blanking the inner plate with its outer poles 20b from the stock and simultaneously shaping the inner poles 22b of the outer plate to-be-blanked from the stock without requiring in this instance any actual trimming of the aperture left in the stock by the inner blank 12b. The outer blank 14b may next be blanked from the stock by suitable members (not shown) of the same die, whereupon the companion die members 74, 78 are retracted sufficiently to reenter the inner blank 12b in the outer blank 14b. The punch 84 may next be retracted, followed by retraction of the upper die members 72 and 74 for release and removal of the plate unit 10b from the die.

The plate unit 10b is next placed in a die 90 (FIGS. 19 to 21) for finish-formation of its blanks or plates 12b and 14b as shown in FIG. 17 in which the finished separate plates are shown in their correct coordination on assembly with a field structure of a synchronous motor. Thus, all poles of the plates 12b and 14b are bent into parallelism and concentricity with the reference rotor axis $xb$ of the inner plate, and the poles of either plate extend oppositely to the poles of the other plate. The die 90 comprises upper and lower die members 92, 94 and 96, 98 of which the upper die members may close on the plate unit 10b on the lower die members, with the plate unit being oriented with its center hole 88 on a locating pin 100 in the lower die member 98. Formed in the lower die member 96 around the inner member 98 is a recess 102 into which active lengths 104 and 106 of the outer and inner poles 20b and 22b of the respective inner and outer blanks 12b and 14b are bent on depressing the companion die members 94, 98 from the positon in FIG. 19 to that shown in FIG. 20. The inner and outer plates 12b and 14b are now finished-formed and also separated, and the die members 92, 94 and 98 are next raised for removal of the plates with their formed poles 20b and 22b from the die recess 102. The lower die member 98 will thus return to its normal position (FIGS. 19 and 21) while the upper die members 92, 94 continue their joint ascent until member 92 reaches its normal upper position (FIG. 21), whereupon the other member 94 continues to rise to and beyond the position shown in FIG. 21 for stripping the finished plates 12b and 14b therefrom for their removal from the die.

Despite the fact that in the intermediate plate unit 10b the poles of either blank fully occupy the gaps between the poles of the other blank (FIG. 16), the active lengths 104 and 106 of the coordinated poles of both finished plates must be spaced from each other (FIG. 17) in order to perform their intended operating function in a motor. To this end, the active lengths of the poles of both blanks in the plate unit 10b are made narrower than their remaining lengths which on the finish-formation of the plates remain in the planes of their original blanks. Thus, the active lengths 104 and 106 of the outer and inner poles 20b and 22b of the respective inner and outer blanks 12b and 14b in the plate unit 10b are formed as narrower continuations of their remaining pole lengths on opposite sides of a ring-shaped reference area $a$ (defined by the dot-and-dash line circles $b$ and $c$) about the reference axis $xb$ (FIG. 16), with the pole-forming recess 102 in the forming die 90 being so arranged that the active pole lengths therein turn from their remaining pole lengths in the planes of the respective plates within this circular reference area $a$ (see also FIGS. 17 and 21).

The finished field plates 12b and 14b have all the aforementioned advantages of the field plates 12 and 14 in the matter of the coordination of their poles with each other and with the reference rotor axis. In fact, the disposition of the active faces 110 and 112 of the pole lengths 104 and 106 of the respective plates 12b and 14b in a true circle about the reference rotor axis is particularly accurate since in the finish-formation of the poles their active faces 110 and 112 are in press and form fit with one and the same die member 94 (FIG. 20).

FIG. 22 shows an intermediate plate unit 10c which is modified from the plate unit 10b of FIG. 16 such that the inner poles 22c of the outer plate 14c need not be bent into parallelism with the reference rotor axis of the inner plate 12b for their final coordination with the outer poles 20c of the inner plate. To this end, the active faces 120 of the inner poles 22c are coincident with the inner one of the dot-and-dash line circles which define the ring-shaped reference area $ac$.

While in the described formation of the inner and outer plates 12, 14 and 12b, 14b their interpressed blanks form an intermediate plate unit for their advantageous finish-formation, it is also within the purview of the present invention to eliminate the formation of the intermediate plate unit. Thus, on blanking the inner plate 12 from the outer plate 14 and trimming the blank-conforming aperture in the outer plate for shaping the inner poles 22 thereof in the die 26 of FIG. 3, the die may be opened without reentering the inner blank in the outer blank, and the separate blanks may then be removed from this die for finish-formation of the inner plate in this instance. The same procedure may be followed in the formation of the inner and outer plates 12b and 14b (FIG. 17), except that after removal of their separate blanks from the die 70 of FIG. 18 both will be finish-formed in the same or separate dies.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a method of producing inner and surrounding outer field plates with complemental outer and inner poles, the steps of shaping the inner plate and the poles of the outer plate by blanking from the outer plate the inner plate with its angularly spaced outward pole projections and gaps therebetween and, by punching waste material from the outer plate, trimming the blank-conforming aperture therein to the shape of the angularly spaced inward pole projections and gaps therebetween, with at least the pole projections of one plate being lengthwise dimensioned for pressfit with their end edges in the gaps between the pole projections of the other plates; and pressing said one plate into said other plate for said pressfit therein.

2. In a method of producing inner and surrounding outer field plates with complemental outer and inner poles, the steps of shaping the inner plate and the poles of the outer plate in a die on closing the same, by blanking from the outer plate the inner plate with its angularly spaced outward pole projections and gaps therebetween and, by punching waste material from the outer plate, trimming the blank-conforming aperture therein to the shape of the angularly spaced inward pole extensions and gaps therebetween, with at least the pole projections of one plate being lengthwise dimensioned for pressfit with their end edges in the gaps between the pole projections of the other plate; while still in the closed die, reentering the inner plate in the trimmed aperture in the outer plate for said pressfit of the end edges of the pole projections of said one plate in the gaps between the pole projections of said other plate; and opening the die for removal therefrom of the outer plate and reentered inner plate.

3. In a method of producing inner and surrounding outer field plates with complemental outer and inner poles, the steps of simultaneously shaping the inner plate and the poles of the outer plate in a die on closing the same, by blanking from the outer plate the inner plate with its angularly spaced outward pole projections and gaps therebetween so as to leave on the outer plate the inward pole projections of the shape, size and angular spacing of the gaps between the pole projections of the inner plate; while still in the closed die, reentering the inner plate in the outer plate in form-fit with the blank-conforming aperture in the latter; and opening the die for removal therefrom of the outer plate and reentered inner plate.

4. In a method of producing inner and surrounding outer field plates with complemental outer and inner poles, respectively, and a center hole in the inner plate, the steps of shaping the poles and hole of the inner plate and the poles of the outer plate in a die on closing the same, by blanking from the outer plate the inner plate with its angularly spaced outward pole extensions and gaps therebetween and punching the hole thereinto and, by punching waste material from the outer plate, trimming the blank-conforming aperture therein to the shape of the angularly spaced inward pole projections and gaps therebetween, with at least the pole projections of one plate being lengthwise dimensioned for pressfit with their end edges in the gaps between the pole projections of the other plate; while still in the closed die, reentering the inner plate in the trimmed aperture of the outer plate for said pressfit of the end edges of the pole projections of said one plate in the gaps between the pole projections of said other plate; and opening the die for removal therefrom of the outer plate and reentered inner plate.

5. In a method of producing inner and surrounding outer field plates with complemental outer and inner poles about a reference axis of the inner plate, the steps of shaping the inner plate and the poles of the outer plate in a die on closing the same, by blanking from the outer plate the inner plate with its angularly spaced outward pole projections and gaps therebetween and, by punching waste material from the outer plate, trimming the blank-conforming aperture therein to the shape of the angularly spaced inward pole formations and gaps therebetween, with at least the pole projections of one plate being lengthwise dimensioned for pressfit with their end edges in the gaps between the pole projection of the other plate; while still in the closed die reentering the inner plate in the trimmed aperture of the outer plate for said pressfit of the end edges of the pole projections of said one plate in the gaps between the pole projections of said other plate; opening the die and removing therefrom the outer plate and reentered inner plate; and transferring the outer plate and reentered inner plate to another die and on closing the latter finish-forming the pole projections by bending at least the pole projections of the inner plate into parallelism with said reference axis.

6. In a method of producing inner and surrounding outer field plates with complemental outer and inner poles about a reference axis of the inner plate, the steps of simultaneously shaping the inner plate and the poles of the outer plate in a die on closing the same, by blanking from the outer plate the inner plate with its angularly spaced outward pole projections and gaps therebetween so as to leave on the outer plate the inward pole projections of the shape, size and angular spacing of the gaps between the pole projections of the inner plate; while still in the closed die, reentering the inner plate in the outer plate in form-fit with the blank-conforming aperture in the latter; opening the die and removing therefrom the outer plate and reentered inner plate; and transferring the outer plate and reentered inner plate to another die and on closing the latter finish-forming the pole projections by bending at least the pole projections of the inner plate into parallelism with said reference axis.

7. In a method of producing inner and surrounding outer field plates having about a reference axis of the inner plate complemental outer and inner poles, respectively, and a hole in the inner plate concentric with said axis, the steps of shaping the poles and hole of the inner plate and the poles of the outer plate in a die on closing the same, by blanking from the outer plate the inner plate with its angularly spaced outward pole projections and gaps therebetween and punching the hole thereinto and, by punching waste material from the outer plate, trimming the blank-conforming aperture therein to the shape of the angularly spaced inward pole projections and gaps therebetween, with at least the pole projections of one plate being lengthwise dimensioned for pressfit with their end edges in the gaps between the pole projections of the other plate; while still in the closed die reentering the inner plate in the trimmed aperture of the outer plate for said pressfit of the end edges of the pole projections of said one plate in the gaps between the pole projections in said other plate: opening the die and removing therefrom the outer plate and reentered inner plate; and transferring the outer plate and reentered inner plate to another die and on closing the latter finish-forming the pole projections by bending at least the pole projetcions of the inner plate into parallelism with said reference axis.

8. In a method of producing inner and surrounding outer field plates having about a reference axis of the inner plate complemental outer and inner poles, respectively, and a hole in the inner plate concentric with said axis, the steps of shaping the poles of the inner and outer plates simultaneously and forming the hole in the inner plate in a die on closing the same, by blanking from the outer plate the inner plate with its angularly spaced outward pole projections and gaps therebetween and punching the hole in the blank so as to leave on the outer plate the angularly spaced inward pole projections of the shape, size and angular spacing of the gaps between the pole projections of the inner plate; while still in the closed die, reentering the inner plate in the outer plate in form-fit with the blank-conforming aperture in the latter; opening the die and removing therefrom the outer plate and reentered inner plate; and transferring the outer plate and reentered inner plate to another die and on closing the latter finish-forming the pole projections by bending at least the pole projections of the inner plate into parallelism with said reference axis.

References Cited by the Examiner

UNITED STATES PATENTS

| 2,305,963 | 12/42 | Hansen et al. | 310—164 |
| 2,711,008 | 6/55 | Smith. | |
| 2,785,424 | 3/57 | McMaster et al. | 310—258 |
| 2,793,307 | 5/57 | Gallagher | 310—164 |
| 2,794,137 | 5/57 | Faus et al. | 310—156 |
| 2,823,327 | 2/58 | Kohlhagen | 310—162 |
| 2,870,356 | 1/59 | Gibson. | |
| 3,094,197 | 6/63 | Atwood | 29—522 X |

JOHN F. CAMPBELL, *Primary Examiner.*

MILTON O. HIRSHFIELD, *Examiner.*